United States Patent
Muraoka et al.

(10) Patent No.: US 9,257,717 B2
(45) Date of Patent: Feb. 9, 2016

(54) NONAQUEOUS ELECTROLYTE SECONDARY BATTERY

(75) Inventors: Yoshiyuki Muraoka, Osaka (JP);
Masaya Ugaji, Tokushima (JP);
Takahiro Aoyama, Shizuoka (JP);
Haruya Nakai, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 148 days.

(21) Appl. No.: 14/233,149

(22) PCT Filed: Apr. 3, 2012

(86) PCT No.: PCT/JP2012/002316
§ 371 (c)(1),
(2), (4) Date: Jan. 15, 2014

(87) PCT Pub. No.: WO2013/014827
PCT Pub. Date: Jan. 31, 2013

(65) Prior Publication Data
US 2014/0141305 A1   May 22, 2014

(30) Foreign Application Priority Data

Jul. 22, 2011   (JP) ................. 2011-160620

(51) Int. Cl.
*H01M 4/13* (2010.01)
*H01M 4/70* (2006.01)
*H01M 10/04* (2006.01)
*H01M 10/052* (2010.01)
*H01M 10/0587* (2010.01)
*H01M 10/42* (2006.01)

(52) U.S. Cl.
CPC ............ *H01M 10/0431* (2013.01); *H01M 4/13* (2013.01); *H01M 4/70* (2013.01); *H01M 10/052* (2013.01); *H01M 10/0587* (2013.01); *H01M 2010/4292* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

2004/0224219 A1   11/2004   Miyaki et al.
2008/0280193 A1*  11/2008   Takagi et al. ............. 429/94

(Continued)

FOREIGN PATENT DOCUMENTS

JP   04-012471 A   1/1992
JP   3131976 B2    2/2001

(Continued)

OTHER PUBLICATIONS

International Search Report issued in International Application No. PCT/JP2012/002316 with Date of mailing Jul. 17, 2012, with English Translation.

*Primary Examiner* — Gregg Cantelmo
(74) *Attorney, Agent, or Firm* — McDermott Will & Emery LLP (57) ABSTRACT

In a wound electrode group, a positive electrode includes positive electrode active material layers formed on both surfaces of a band-like positive electrode current collector, and a negative electrode includes negative electrode active material layers on both surfaces of a band-like negative electrode current collector. Charge capacity of the negative electrode falls within a range of 83-99% of theoretical capacity of the negative electrode in a full charge state of a nonaqueous electrolyte secondary battery. An active material mass M1 per unit area of a negative electrode active material layer formed on an outer circumference of the negative electrode current collector, and an active material mass M2 per unit area of a negative electrode active material layer formed on an inner circumference satisfy a relational expression of $M1/M2 < (R1+t/2)/(R1-t/2)$, where the electrode group has an innermost diameter of R1, and the negative electrode has a thickness of t.

6 Claims, 4 Drawing Sheets

(56) References Cited

U.S. PATENT DOCUMENTS

| | | |
|---|---|---|
| 2009/0253033 A1 | 10/2009 | Hirose et al. |
| 2009/0317721 A1* | 12/2009 | Shirane et al. ............ 429/231.95 |
| 2010/0104930 A1* | 4/2010 | Kim et al. ........................ 429/94 |
| 2011/0287288 A1* | 11/2011 | Hina et al. ........................ 429/94 |
| 2012/0145428 A1* | 6/2012 | Tokunaga et al. ................ 429/94 |

FOREIGN PATENT DOCUMENTS

| | | | |
|---|---|---|---|
| JP | 2004-311331 A | | 11/2004 |
| JP | 2010-521793 A | | 6/2010 |
| JP | 2010165563 A | * | 7/2010 |
| JP | 2010-277806 A | | 12/2010 |
| JP | 2011023131 A | * | 2/2011 |

* cited by examiner

POSITIVE
ELECTRODE

NEGATIVE
ELECTRODE

FIG.2B

POSITIVE
ELECTRODE

NEGATIVE
ELECTRODE

FIG.3A

POSITIVE
ELECTRODE

NEGATIVE
ELECTRODE

FIG.3B

POSITIVE
ELECTRODE

NEGATIVE
ELECTRODE

NONAQUEOUS ELECTROLYTE SECONDARY BATTERY

TECHNICAL FIELD

The present disclosure relates to greater capacity nonaqueous electrolyte secondary batteries.

BACKGROUND ART

In recent years, with miniaturization and reduction in the weights of electronic devices such as mobile phones and laptops, an increase in the capacity of secondary batteries, which are power sources of these electronic devices, has been increasingly demanded. For example, nonaqueous electrolyte secondary batteries (e.g., lithium-ion secondary batteries) meet the demand.

In general, an electrode group, which is formed by winding or stacking a positive electrode and a negative electrode with a separator interposed therebetween, is used in a nonaqueous electrolyte secondary battery.

Patent Document 1 shows a nonaqueous electrolyte secondary battery using a wound electrode group. In the battery, the filling amount of an active material formed on the inner circumference of a current collector is smaller than the filling amount of an active material formed on the outer circumference of the current collector, and the ratio of the filling amount of the active material on the outer circumference to the filling amount of the active material on the inner circumference gradually increases from the center of the wound electrode group toward the outside in order to improve the cycle characteristics of the battery. This reduces the difference between the filling amount of the active material on the inner circumference and the filling amount of the active material on the outer circumference in the entire region of the wound electrode group.

CITATION LIST

Patent Document

PATENT DOCUMENT 1: Japanese Unexamined Patent Publication No. 2010-52179

SUMMARY OF THE INVENTION

Technical Problem

In a wound electrode group, out of active material layers formed on the both surfaces of a current collector, the active material layer formed on the inner circumferential is compressed, thereby increasing the mass of the active material per unit area. On the other hand, the active material layer on the outer circumference is extended, thereby reducing the mass of the active material per unit area. This tendency is most significant in the center of the electrode group with a small radius of curvature.

One means of increasing the capacity of a nonaqueous electrolyte secondary battery is to increase the load capacity of a negative electrode active material. The load capacity (mAh/g) is obtained by dividing the capacity per unit area (mAh/cm$^2$) of the positive electrode in full charge by the mass per unit area (g/cm$^2$) of the active material of the negative electrode. Specifically, in a conventional nonaqueous electrolyte secondary battery, the ratio of the mass of the negative electrode active material to the mass of the positive electrode active material may be reduced. Assume that the negative electrode is made of, for example, carbon. The reversible capacity of carbon is 372 mAh/g. If the mass of the negative electrode is reduced too much so that the load capacity of the negative electrode exceeds 372 mAh/g, the negative electrode cannot accept lithium ions released from the positive electrode in charge of the battery. As a result, metal lithium may be deposited on the surface of the negative electrode.

On the other hand, in employing the technique shown in Patent Document 1, the filling amount of the active material formed on the inner circumference of the current collector is smaller than the filling amount of the active material formed on the outer circumference of the current collector. Thus, when the ratio of the mass of the negative electrode active material to the mass of the positive electrode active material is reduced to increase the capacity, the following problems may occur.

Specifically, in a wound electrode group, in which positive and negative electrodes face one another, a positive electrode active material layer formed on the inner circumference of the outer positive electrode is compressed, while a negative electrode active material layer formed on the outer circumference of the inner negative electrode is extended. Thus, when the ratio of the mass of the negative electrode active material to the mass of the positive electrode active material is reduced to increase the capacity, the load capacity per unit area of the negative electrode may exceed the theoretical capacity of the negative electrode. In this case, if the load capacity of the negative electrode exceeds the theoretical capacity of the negative electrode, metal such as lithium may be deposited on the negative electrode active material layer formed on the outer circumference of the negative electrode. The metal such as lithium caused thereby is deposited most significantly inside of the electrode group with a small radius of curvature.

The present disclosure was made in view of the problems. It is a principal objective of the present disclosure to provide a nonaqueous electrolyte secondary battery with greater capacity and excellent cycle characteristics without causing deposition of metal such as lithium.

Solution to the Problem

A nonaqueous electrolyte secondary battery according to the present disclosure includes an electrode group formed by winding a positive electrode and a negative electrode with a porous insulating layer interposed therebetween. The positive electrode includes positive electrode active material layers on both surfaces of a band-like positive electrode current collector. The negative electrode includes negative electrode active material layers on both surfaces of a band-like negative electrode current collector. Charge capacity of the negative electrode falls within a range of 83-99% of theoretical capacity of the negative electrode in a full charge state of the nonaqueous electrolyte secondary battery. An active material mass M1 per unit area of a first negative electrode active material layer, which is formed on an outer circumference of the negative electrode current collector, and an active material mass M2 per unit area of a second negative electrode active material layer, which is formed on an inner circumference of the negative electrode current collector, satisfy a relational expression of:

$$M1/M2 < (R1+t/2)/(R1-t/2),$$

where the electrode group has an innermost diameter of R1, and the negative electrode has a thickness of t.

In a preferred embodiment, the active material mass M1 per unit area of the one of the negative electrode active material layers, which is formed on the outer circumference of the negative electrode current collector, and the active material mass M2 per unit area of the other of the negative electrode active material layers, which is formed on the inner circumference of the negative electrode current collector, satisfy a relational expression of:

$(R2+t/2)/(R2-t/2)<M1/M2$, where the electrode group has an outermost diameter of R2.

Advantages of the Invention

The present disclosure provides a great-capacity nonaqueous electrolyte secondary battery with excellent cycle characteristics without causing deposition of metal such as lithium.

DESCRIPTION OF EMBODIMENTS

Before describing embodiments, the history of making the present disclosure will be described.

Figure 1:
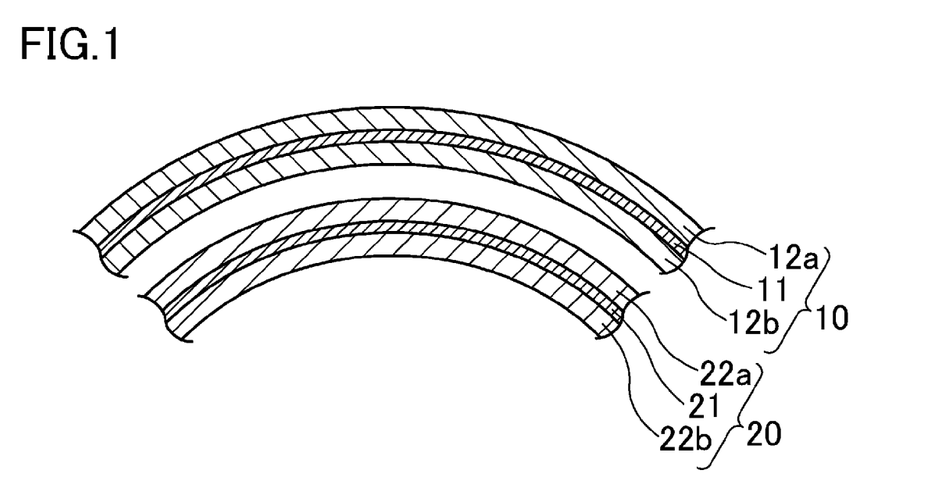
FIG. 1 is an enlarged cross-sectional view of part of facing positive and negative electrodes of a wound electrode group.

FIG. 1 is an enlarged cross-sectional view of part of facing positive and negative electrodes with a separator interposed therebetween in a wound electrode group.

In FIG. 1, a positive electrode 10 includes positive electrode active material layers 12a and 12b formed on both surfaces of a positive electrode current collector 11. A negative electrode 20 includes negative electrode active material layers 22a and 22b on both surface of a negative electrode current collector 21. The positive electrode active material layer 12b, which is formed on the inner circumference of the outer positive electrode 10, faces the negative electrode active material layer 22a formed on the outer circumference of the inner negative electrode 20 with a separator (not shown) interposed therebetween. Lithium ions move between the facing positive electrode active material layer 12b and negative electrode active material layer 22a, thereby performing charge and discharge.

In the positional relation between the facing positive electrode 10 and negative electrode 20, the outermost circumference of the electrode group is referred to as outside and the innermost circumference of the electrode group is referred to as inside. Out of the active material layers formed on the both surfaces of the current collector of each of the positive electrode 10 and the negative electrode 20, the active material layer formed outside is referred to as an active material layer formed on the outer circumference, and the active material layer formed inside is referred to as an active material layer formed on the inner circumference.

As shown in FIG. 1, in the facing positive electrode 10 and negative electrode 20, the positive electrode active material layer 12b formed on the inner circumference of the outer positive electrode 10 (hereinafter referred to as an "inner circumferential positive electrode active material layer") is compressed. The negative electrode active material layer 22a formed on the outer circumference of the inner negative electrode 20 (hereinafter referred to as an "outer circumferential negative electrode active material layer") is extended.

Figure 2A:
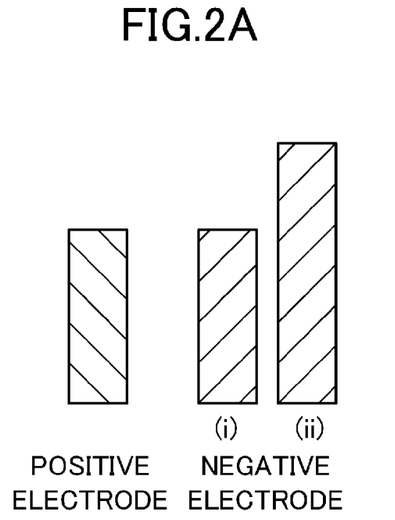
FIGS. 2A and 2B schematically illustrate the magnitude of the capacity of the positive electrode and the load capacity (i) and the theoretical capacity (ii) of the negative electrode.
Figure 2B:
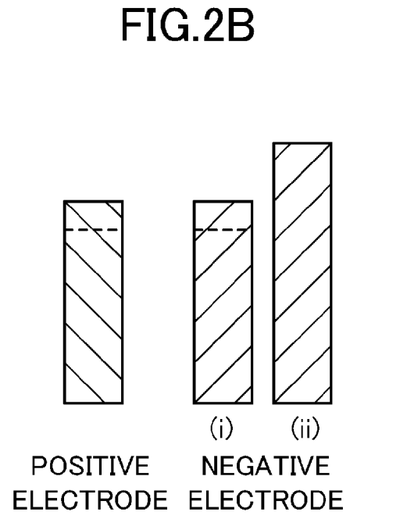

FIGS. 2A and 2B schematically illustrate the magnitude of the capacity of the positive electrode, and the load capacity (i) and the theoretical capacity (ii) of the negative electrode of the facing positive electrode 10 and negative electrode 20. FIG. 2A illustrates the capacity of the positive electrode, and the load capacity (i) and the theoretical capacity (ii) of the negative electrode of unwound band-like positive and negative electrodes. FIG. 2B illustrates the capacity of the positive electrode, and the load capacity (i) and the theoretical capacity (ii) of the negative electrode of the wound positive and negative electrodes. In FIG. 2B, the capacity of the positive electrode is the capacity of the inner circumferential positive electrode active material layer 12b. The load capacity (i) of the negative electrode is the load capacity of the negative electrode active material layer 22a on the outer circumference in FIG. 1.

As shown in FIG. 2A, the load capacity (i) of the negative electrode is greater than the theoretical capacity (ii) of the negative electrode. Thus, as shown in FIG. 2B, even if the inner circumferential positive electrode active material layer 12b is compressed and the negative electrode active material layer 22a on the outer circumference is extended after the winding, the margin remains between the theoretical capacity (ii) of the negative electrode and the load capacity (i) of the negative electrode.

Figure 3A:
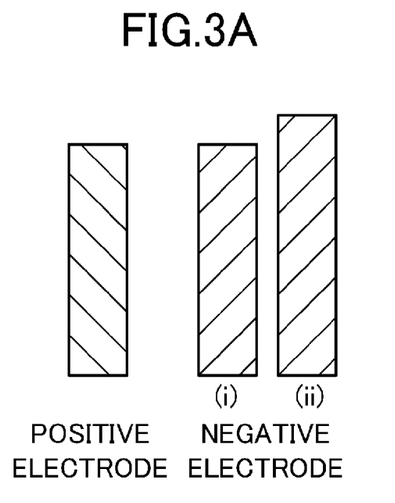
FIGS. 3A and 3B schematically illustrate the magnitude of the masses per unit area of the positive electrode active material and the negative electrode active material of a greater capacity nonaqueous electrolyte secondary battery.
Figure 3B:
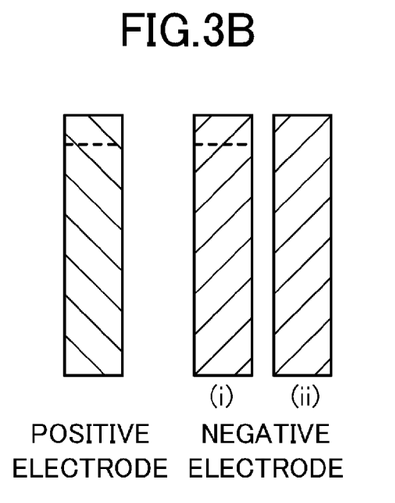

However, as shown in FIG. 3A, assume that the ratio of the mass of the active material of the negative electrode to the mass of the active material of the positive electrode is reduced so that the load capacity (i) of the negative electrode is reduced to increase the capacity of the nonaqueous electrolyte secondary battery. As shown in FIG. 3B, after the winding, the inner circumferential positive electrode active material layer 12b is compressed, and the negative electrode active material layer 22a on the outer circumference is extended. As a result, the margin remains between the theoretical capacity (ii) of the negative electrode and the load capacity (i) of the negative electrode hardly. Thus, in charge of the battery, if part of the lithium ions coming out of the positive electrode active material layer 12b cannot enter the negative electrode active material layer 22a. Then, lithium may be deposited on the surface of the negative electrode active material layer. The deposition of lithium caused thereby is significant in the center of the electrode group with a small radius of curvature.

The present inventors focused on that the above-described problems may occur in increasing the load capacity of the negative electrode (i.e., the ratio of the mass of the negative electrode active material to the mass of the positive electrode active material) to increase the capacity, and made the present disclosure.

An embodiment of the present disclosure will be described hereinafter in detail with reference to the drawings. The present disclosure is not limited to the following embodiment. All suitable modifications and equivalents may be resorted to, falling within the scope of the invention.

Figure 4:
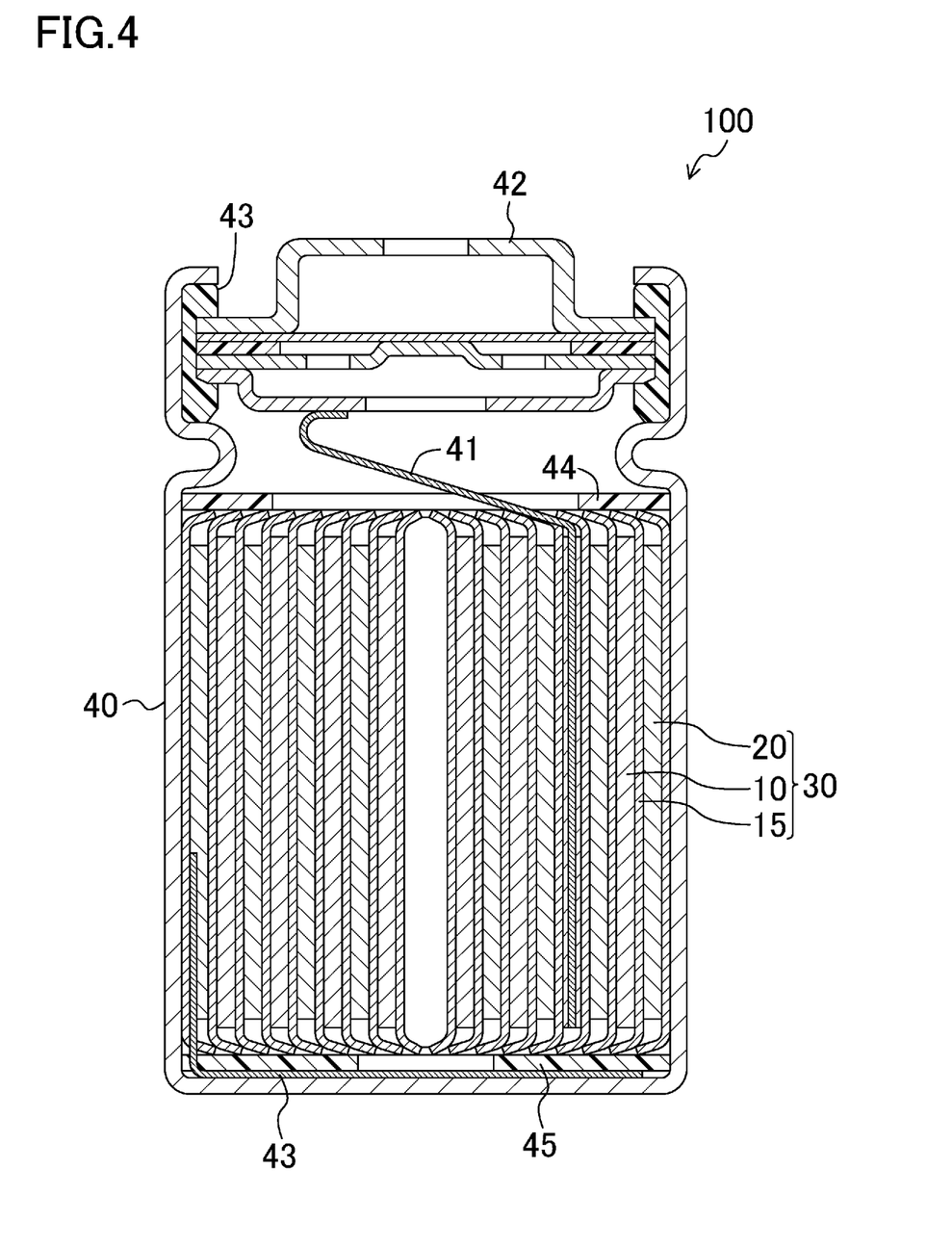
FIG. 4 is a cross-sectional view illustrating the structure of a nonaqueous electrolyte secondary battery according to an embodiment of the present disclosure.

FIG. 4 is a cross-sectional view illustrating the structure of a nonaqueous electrolyte secondary battery 100 according to an embodiment of the present disclosure.

As shown in FIG. 4, a wound electrode group 30, which is formed by winding the positive electrode 10 and the negative electrode 20 with a separator (i.e., a porous insulating film) 15 interposed therebetween, is contained in a battery case 40. Insulating plates 44 and 45 are disposed above and below the electrode group 30. An opening of the battery case 40 is sealed with a sealing plate 42, which also serves as a positive electrode terminal, with a gasket 43 interposed therebetween.

The positive electrode 10 includes the positive electrode active material layers formed on the both surfaces of the positive electrode current collector. The negative electrode 20 includes the negative electrode active material layers formed on the both surfaces of the negative electrode current collector. One end of a positive electrode lead 41 is connected to an end of the positive electrode 10 exposing the positive electrode current collector. The other end of the positive electrode lead 41 is connected to the sealing plate 42. One end of a negative electrode lead 43 is connected to an end of the negative electrode 20 exposing the negative electrode current collector. The other end of negative electrode lead 43 is connected to the bottom of the battery case 40, which also serves as a negative electrode terminal.

Figure 5:
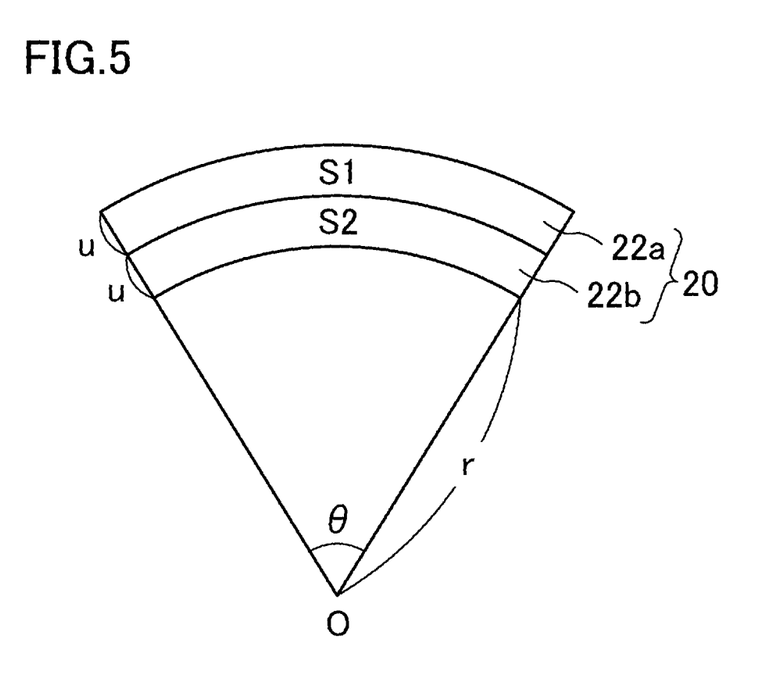
FIG. 5 is an enlarged cross-sectional view of part of the negative electrode of the wound electrode group.

FIG. 5 is an enlarged cross-sectional view of part of the negative electrode 20 located at a distance of a radius r from the center O of the electrode group formed by winding the positive electrode 10 and the negative electrode 20 with the separator interposed therebetween.

FIG. 5 shows negative electrode active material layers formed on the both surfaces of a negative electrode current collector (not shown). Assume that S1 is the area of the negative electrode active material layer 22a on the outer circumference, and S2 is the area of the negative electrode active material layer on the inner circumference 22b is S2 at a central angle θ. S1 and S2 are obtained as follows.

$$S1 = 1/2(r+u)^2\theta - 1/2r^2\theta$$
$$= 1/2(2r+u)u\theta,$$

and $$S2 = 1/2r^2\theta - 1/2(r-u)^2\theta$$
$$= 1/2(2r-u)u\theta,$$

where the thickness of each of the negative electrode active material layers 22a and 22b is u.

In these equations, since r is considered much greater than t, r−u approximates r (i.e., r−u≈r).

Therefore, the area ratio of S1 to S2 is obtained from the following equation (1).

$$S1/S2 = (2r+u)/(2r-t) \tag{1}$$

The present inventors considered that the difference (i.e., the imbalance), which is caused when the active material mass per unit area of the negative electrode active material layer 22a on the outer circumference decreases due to extension, and when the active material mass per unit area of the negative electrode active material layer on the inner circumference 22b increases due to compression, is compensated by setting the active material mass M1 per unit area on the outer circumference, and the active material mass M2 per unit area on the inner circumference as follows.

$$M1/M2 = S1/S2$$

M1 and M2 are the masses of the active materials of the unwound band-like negative electrodes.

The radius of curvature of the wound electrode group decreases with decreasing distance to the inner circumference. Thus, the difference (i.e., the imbalance), which is caused when the masses of the active materials increase and decrease due to the compression and extension of the negative electrode active material layers in the entire area, is compensated by setting M1/M2 within the range satisfying the following relational expression (2) of:

$$M1/M2 < (R1+t/2)/(R1-t/2), \tag{2}$$

where the electrode group has an innermost diameter of R1, and the negative electrode 20 has a thickness of t. Since the thickness of the negative electrode current collector is smaller than the thickness of the negative electrode active material layers 22a and 22b, u approximates t/2 (i.e., u≈t/2) in the expression (1). In addition, 2r is replaced with R1 (i.e., 2r=R1).

As such, the mass ratio of the active material mass M1 per unit area of the negative electrode active material layer 22a formed on the outer circumference of the negative electrode current collector to the active material mass M2 per unit area of the negative electrode active material layer 22b formed on the inner circumference of the negative electrode current collector falls within the range satisfying the above relational expression (2). Even when the ratio of the mass of the negative electrode active material to the mass of the positive electrode active material decreases in this manner to increase the capacity of the nonaqueous electrolyte secondary battery, the margin can be maintained between the load capacity of the negative electrode and the theoretical capacity of the negative electrode. As a result, a nonaqueous electrolyte secondary battery can be provided with excellent cycle characteristics without causing deposition of metal such as lithium.

In the outermost circumference of the wound electrode group, in order to compensate the difference (i.e., the imbalance), which is caused when the masses of the active materials increase and decrease due to the compression and extension of the negative electrode active material layers, the ratio M1/M2 preferably satisfies the following relational expression of:

$$(R2+t/2)/(R2-t/2) < M1/M2,$$

where the electrode group has an outermost diameter of R2.

In the entire area of the wound electrode group, the ratio M1/M2 preferably has the value satisfying the following equation so that the difference (i.e., the imbalance) is the lowest, which is caused when the active material masses increase and decrease due to the compression and extension of the negative electrode active material layers.

$$M1/M2 = [(R1+R2)/2+t/2]/[(R1+R2)/2-t/2]$$

In a wound electrode group, the problem of the deposition of metal such as lithium in negative electrode active material layers occurs, when the ratio of the mass of an active material of a negative electrode to the mass of an active material of a positive electrode is decreased, and the load capacity of the negative electrode is increased to increase the capacity of a nonaqueous electrolyte secondary battery.

The present disclosure is advantageous in a lithium-ion secondary battery including a negative electrode with a great load capacity, and is thus applicable to a nonaqueous electrolyte secondary battery in which the charge capacity of a negative electrode in a full charge state falls within the range from 83% to 99% of the theoretical capacity of the negative electrode.

For example, if the negative electrode active material is carbon (e.g., graphite), the present disclosure is applicable to a lithium-ion secondary battery in which the charge capacity of a negative electrode in a full charge state falls within the range from 310 mAh/g to 372 mAh/g.

In the present disclosure, the materials and the formation of the elements of the nonaqueous electrolyte secondary battery are not limited particularly. The following materials and the formation may be used.

The positive electrode current collector may be a metal sheet, etc., mainly made of aluminum. In particular, aluminum-containing iron atoms are preferable. The positive electrode active material may be, for example, lithium composite oxide such as lithium cobaltate, lithium nickelate, and lithium manganite. The binder for the positive electrode is preferably made of polyvinylidene fluoride (PVDF). The conductive agent for the positive electrode may be made of, for example, graphite such as natural graphite and artificial graphite, carbon blacks, conductive fibers such as a carbon fiber and a metal fiber.

The negative electrode current collector may be made of, for example, stainless steel, nickel, copper, etc. The negative electrode active material may be, for example, metal, a metal fiber, oxide, nitride, a tin-containing material, a silicon-containing material, etc., in place of a carbon material such as natural graphite.

The separator may be made of, for example, polyolefin such as polyethylene and polypropylene.

The non-aqueous electrolyte may be made of a liquid, gel, or solid (i.e., a solid polymer electrolyte) material. The liquid non-aqueous electrolyte (i.e., the nonaqueous electrolyte) is obtained by dissolving the electrolyte (e.g., lithium salt) in a nonaqueous solvent. The gel non-aqueous electrolyte contains a non-aqueous electrolyte and a polymer material holding the non-aqueous electrolyte.

In order to verify the advantage, the present inventors fabricated the following lithium ion secondary battery with greater capacity, and evaluated the cycle characteristics.

(1) Fabrication of Positive Electrode $LiNi_{0.82}Co_{0.15}Al_{0.03}O_2$ with an average particle diameter of 13 μm was used as a positive electrode active material. One part by weight (pbw) of acetylene black (i.e., a conductive agent), 0.9 pbw of polyvinylidene fluoride (PVDF, a binder), and a N-methyl-2-pyrrolidone (NMP) solution were mixed into 100 pbw of the positive electrode active material to obtain a positive electrode mixture slurry.

Next, the obtained positive electrode mixture slurry was applied onto the both surfaces of an iron-containing aluminum foil, which was a positive electrode current collector with a thickness of 15 μm. After the positive electrode mixture slurry was dried, the positive electrode current collector was rolled to obtain a positive electrode plate with a positive electrode active material density of 3.65 g/cc and a thickness of 0.166 mm.

Then, the obtained positive electrode plate was cut into a positive electrode with a width of 58.5 mm and a length of 560 mm. After that, the obtained positive electrode was subjected to thermal treatment in contact with a hot roll of 190° C. for 3 seconds.

(2) Fabrication of Negative Electrode

Graphite with an average particle diameter of about 20 μm was used as a negative electrode active material. One part by weight (pbw) of styrene butadiene rubber (i.e., a binder), and 100 pbw of a solution containing 1 mass % of carboxymethyl cellulose were mixed into 100 pbw of the negative electrode active material to obtain a negative electrode mixture slurry.

Next, the obtained negative electrode mixture slurry was applied onto the both surfaces of a copper foil with a thickness of 8 μm. After the negative electrode mixture slurry was dried, the negative electrode current collector was rolled to obtain a negative electrode plate with a negative electrode active material density of 1.60 g/cc and a thickness of 0.195 μm.

Then, the obtained negative electrode plate was cut into a negative electrode with a width of 59.5 mm and a length of 640 mm. After that, the obtained negative electrode was subjected to thermal treatment in hot air of 190° C. for 10 hours in a nitrogen atmosphere.

(3) Preparation of Electrolyte

Vinylene carbonate was added, at a concentration of 5 wt. %, to a solvent mixture containing ethylene carbonate and dimethyl carbonate in a volume ratio of 1:3. $LiPF_6$ was dissolved in this solution at a concentration of 1.4 mol/L.

(4) Assembly of Lithium-Ion Secondary Battery

A positive electrode and a negative electrode were wound around a winding core with a diameter of 3.5 mm with a polyethylene separator interposed therebetween to fabricate an electrode group. The obtained electrode group has an innermost diameter of 3.5 mm and an outermost diameter of 17.8 mm.

Then, the electrode group was contained in a battery case together with an electrolyte, and the opening of the battery case is sealed to fabricate a cylindrical lithium-ion secondary battery as shown in FIG. 4.

The charge capacity of the negative electrode in a full charge state of the lithium-ion secondary battery was set to 352 mAh/g. This capacity corresponds to 95% of the theoretical capacity (372 mAh/g) of the negative electrode active material (i.e., carbon).

(5) Evaluation of Cycle Characteristics

The fabricated lithium-ion secondary battery was charged to reach 4.2 V with a constant current of 0.5 C under the condition of 25° C. After charge was performed at a constant voltage of 4.2 V until the current value reaches 0.01 C, discharge was performed to reach 2.5 V with a constant current of 1.0 C. This capacity was regarded as the capacity of a first cycle. The charge/discharge cycles were repeated under the same condition, and the number of the cycles was measured until the capacity became 80% of the capacity of the first cycle.

Table 1 shows the result. Batteries A-E were fabricated while changing a thickness T1 of a negative electrode active material layer formed on the outer circumference of a negative electrode current collector, and a thickness T2 of a negative electrode active material layer formed on the inner circumference of the negative electrode current collector. The total thickness (T1+T2) of the negative electrode active material layers formed on the both surfaces of each negative electrode current collector was uniform (187 μm).

TABLE 1

|  | T1 [μm] | T2 [μm] | T1/T2 | Number of Cycles |
| --- | --- | --- | --- | --- |
| Battery A | 93.5 | 93.5 | 1.0 | 350 |
| Battery B | 94.0 | 93.0 | 1.01 | 450 |
| Battery C | 95.0 | 92.0 | 1.03 | 500 |
| Battery D | 96.0 | 91.0 | 1.06 | 450 |
| Battery E | 98.0 | 89.0 | 1.10 | 350 |

As shown in Table 1, in the battery A, the thickness T1 of the negative electrode active material layer on the outer circumference is equal to the thickness T2 of the negative electrode active material layer on the inner circumference. Compared to the battery A, the cycle characteristics clearly improved in the batteries B-D, in which the thickness T1 of the negative electrode active material layer on the outer circumference is greater than the thickness T2 of the negative electrode active material layer on the inner circumference.

The reason is considered as follows. In advance, the thickness T1 of the negative electrode active material layer on the outer circumference was made greater than the thickness T2 of the negative electrode active material layer on the inner circumference. This compensated the difference (i.e., the imbalance) caused when the active material mass decreases due to extension of the negative electrode active material layer on the outer circumference, and the active material mass increases due to compression of the negative electrode active material layer on the inner circumference. The batteries A-E were fabricated with a constant negative electrode active material density. Thus, the thicknesses T1 and T2 per unit area of the negative electrode active material layers are proportional to the masses M1 and M2 per unit area of the negative electrode active materials.

On the other hand, in the battery E, the cycle characteristics decreased. The reason is considered as follows. Since the radius of curvature was great in the outermost circumference of the electrode group, the active material mass of the negative electrode active material layer on the inner circumference decreased too much so that there was no margin between the load capacity and the theoretical capacity of the negative electrode. As a result, lithium was deposited on the negative electrode active material layer on the inner circumference, thereby reducing the cycle characteristics.

Therefore, as shown in Table 1, the T1/T2 ratio, i.e., the M1/M2 ratio, is set within a range from 1.01 to 1.06 to reduce the mass of the negative electrode active material to the mass of the positive electrode active material. As a result, a lithium-ion secondary battery with excellent cycle characteristics is provided without causing deposition of lithium, even when the capacity of the lithium-ion secondary battery is increased.

The relational expression (2) is as follows.

$$M1/M2 < (R1+t/2)/(R1-t/2) = 1.057, \qquad (2)$$

here the electrode group has an innermost diameter (R1) of 3.5 mm, and the negative electrode has a thickness (t) of 93.5 μm.

By setting the M1/M2 ratio within the range satisfying the relational expression (2), a lithium-ion secondary battery with excellent cycle characteristics is provided without causing deposition of lithium, even when the capacity of the lithium-ion secondary battery is increased.

Table 2 illustrates comparison between the cycle characteristics of the battery C and the battery F. The battery F was fabricated using a negative electrode fabricated under the same condition as the battery C such that the mass of the positive electrode active material on the inner circumference of the positive electrode current collector was smaller than the mass of the positive electrode active material on the outer circumference. In the battery C, the mass of the positive electrode active material on the inner circumference was smaller than the mass of the positive electrode active material on the outer circumference by 0.2%. In the battery F, the mass of the positive electrode active material on the inner circumference was smaller than the mass of the positive electrode active material on the outer circumference by 1.0%.

TABLE 2

| | T1 [μm] | T2 [μm] | T1/T2 | Mass Difference between Positive Electrode Active Material Layers | Number of Cycles |
|---|---|---|---|---|---|
| Battery C | 95.0 | 92.0 | 1.03 | 0.2% | 500 |
| Battery F | 95.0 | 92.0 | 1.03 | 1.0% | 550 |

As shown in Table 2, as compared to the battery C, the cycle characteristics clearly improved in the battery F, in which the mass of the positive electrode active material on the inner circumference of the positive electrode current collector was smaller than the mass of the positive electrode active material on the outer circumference.

The reason is considered as follows. The active material mass of positive electrode active material layer formed on the inner circumference of the outer positive electrode decreased. The margin between the load capacity and the theoretical capacity of the negative electrode was maintained in the negative electrode active material layer formed on the outer circumference of the inner negative electrode facing the positive electrode.

While the present disclosure has been described using the preferred embodiment, such description should not be construed as limiting, and various modifications can be made thereto. For example, while the above-described embodiment has been described where the nonaqueous electrolyte secondary battery is the lithium-ion secondary battery. The present disclosure is not limited thereto, and is also applicable to, for example, a nickel-hydrogen battery, a nickel-cadmium battery, etc.

INDUSTRIAL APPLICABILITY

The nonaqueous electrolyte secondary battery according to the present disclosure has great capacity and excellent cycle characteristics, and is useful for wide-range power sources of portable electronic devices, electric vehicles, etc.

DESCRIPTION OF REFERENCE CHARACTERS

10 Positive Electrode
11 Positive Electrode Current Collector
12a, 12b Positive Electrode Active Material Layers
20 Negative Electrode
21 Negative Electrode Current Collector
22a, 22b Negative Electrode Active Material Layers
30 Electrode Group
40 Battery Case
41 Positive Electrode Lead
42 Sealing Plate
43 Gasket
43 Negative Electrode Lead
44, 45 Insulating Plates
100 Nonaqueous Electrolyte Secondary Battery

The invention claimed is:

1. A nonaqueous electrolyte secondary battery comprising:
an electrode group formed by winding a positive electrode and a negative electrode with a porous insulating layer interposed therebetween, wherein
the positive electrode includes positive electrode active material layers on both surfaces of a band-like positive electrode current collector,
the negative electrode includes negative electrode active material layers on both surfaces of a band-like negative electrode current collector,
charge capacity of the negative electrode falls within a range of 83-99% of theoretical capacity of the negative electrode in a full charge state of the nonaqueous electrolyte secondary battery, and
an active material mass M1 per unit area of one of the negative electrode active material layers, which is formed on an outer circumference of the negative electrode current collector, and an active material mass M2 per unit area of the other of the negative electrode active material layers, which is formed on an inner circumference of the negative electrode current collector, satisfy a relational expression of $$M1/M2 < (R1+t/2)/(R1-t/2),$$

where the electrode group has an innermost diameter of R1, and the negative electrode has a thickness of t.

2. The nonaqueous electrolyte secondary battery of claim 1, wherein
the active material mass M1 per unit area of the one of the negative electrode active material layers, which is formed on the outer circumference of the negative electrode current collector, and the active material mass M2 per unit area of the other of the negative electrode active material layers, which is formed on the inner circumference of the negative electrode current collector, satisfy a relational expression of $$(R2+t/2)/(R2-t/2) < M1/M2,$$

where the electrode group has an outermost diameter of R2.

3. The nonaqueous electrolyte secondary battery of claim 1, wherein
the nonaqueous electrolyte secondary battery is a lithium-ion secondary battery,
a negative electrode active material is carbon, and
the charge capacity of the negative electrode falls within a range from 310 mAh/g to 372 mAh/g in the full charge state of the nonaqueous electrolyte secondary battery.

4. The nonaqueous electrolyte secondary battery of claim 1, wherein
the negative electrode active material layers formed on the both surfaces of the band-like negative electrode current collector have the same active material density, and
a thickness T1 of the one of the negative electrode active material layers, which is formed on the outer circumference of the negative electrode current collector, and a thickness T2 of the other of the negative electrode active material layers, which is formed on the inner circumference of the negative electrode current collector, satisfy a relation of $$T1/T2 < (R1+t/2)/(R1-t/2).$$

5. The nonaqueous electrolyte secondary battery of claim 1, wherein
an active material mass per unit area of one of the positive electrode active material layers, which is formed on an inner circumference of the positive electrode current collector, is smaller than the active material mass per unit area of the other of the positive electrode active material layers, which is formed on the outer circumference of the positive electrode current collector.

6. The nonaqueous electrolyte secondary battery of claim 2, wherein
the relation between the masses M1 and M2 satisfies a relational expression of $$M1/M2 = [(R1+R2)/2+t/2]/[(R1+R2)/2-t/2].$$

* * * * *